(12) United States Patent
Spadea

(10) Patent No.: US 6,550,734 B1
(45) Date of Patent: Apr. 22, 2003

(54) CANTILEVERED SUPPORT FOR WIRED DEVICE

(75) Inventor: Thomas G. Spadea, Haverford, PA (US)

(73) Assignee: LBP Communications, Inc., Conshohocken, PA (US)

( * ) Notice: Subject to any disclaimer, the term of this patent is extended or adjusted under 35 U.S.C. 154(b) by 0 days.

(21) Appl. No.: 09/978,147

(22) Filed: Oct. 15, 2001

(51) Int. Cl.[7] .............................................. F16M 13/00
(52) U.S. Cl. .............................. 248/280.11; 248/274.1; 248/281.11; 248/282.1
(58) Field of Search .......................... 248/278.1, 284.1, 248/292.11, 292.13, 281.11, 280.11, 123.11, 274.1, 917–922, 281.1

(56) References Cited

U.S. PATENT DOCUMENTS

| | | | | |
|---|---|---|---|---|
| 2,131,693 A | * | 9/1938 | Smith | 248/586 |
| 2,834,568 A | * | 5/1958 | Foster | 248/593 |
| 3,041,060 A | * | 6/1962 | Jacobsen | 248/284.1 |
| 3,409,261 A | * | 11/1968 | Leporative | 248/284.1 |
| 3,426,190 A | * | 2/1969 | Bobrick | 248/284.1 |
| 4,160,536 A | * | 7/1979 | Krogsrud | 248/123.11 |
| 4,213,591 A | * | 7/1980 | Jaakkola | 248/281.11 |
| 4,215,250 A | | 7/1980 | Resener | |
| 4,447,031 A | * | 5/1984 | Souder, Jr. et al. | 248/281.11 |
| 4,712,313 A | * | 12/1987 | Gettleman | 248/205.2 |
| 4,914,861 A | | 4/1990 | May | |
| 4,953,822 A | * | 9/1990 | Sharber et al. | 248/280.11 |
| 5,108,061 A | | 4/1992 | Vlasak | |
| 5,263,233 A | | 11/1993 | Kim et al. | |
| 5,454,042 A | | 9/1995 | Drever | |
| 5,732,920 A | | 3/1998 | Reynoso et al. | |
| 6,064,426 A | * | 5/2000 | Waterman | 348/63 |
| 6,409,134 B1 | * | 6/2002 | Oddsen, Jr. | 248/274.1 |

* cited by examiner

Primary Examiner—Leslie A. Braun
Assistant Examiner—Tan Le
(74) Attorney, Agent, or Firm—Michael B. Fein; Brian L. Belles; Cozen O'Connor PC

(57) ABSTRACT

Cantilevered apparatus for supporting a wired device such as a microphone, video camera, lamp, or illuminated microscope in any desired position comprising boom arms having a U-shaped channel which receives the wire for the device. A method of supporting the wired device wherein the wire can be easily removed and replaced, and yet is essentially hidden from view in most directions, is also disclosed.

10 Claims, 4 Drawing Sheets

CANTILEVERED SUPPORT FOR WIRED DEVICE

BACKGROUND OF THE INVENTION

This invention relates to the field of adjustable counterbalanced support apparatus.

Adjustable counterbalanced support apparatus are very commonly used to support wired devices such as microphones, video cameras, lamps, microscopes, illuminated magnifying glasses, and other wired devices wherein a user may easily move the wired device to a different horizontal and vertical position. U.S. Pat. No. 5,108,061 illustrates such conventional apparatus. In most cases, electrical wire is used to connect the wired device with a power source, amplifier, video imput, or other electrical connector, and such wire must be threaded through a hollow support arm. The support arms are most commonly steel members having a square cross section, usually formed by bending sheet steel into a square shape. The wire is usually threaded through the support members at the factory. If it is desired to change the wired device being supported, or the wire, it is very difficult with current and prior art adjustable counterbalanced support apparatus to remove the old wire and rethread new wire. In many cases the user merely attaches the new wire to the outside of the support member with tape or ties such as plastic ties.

It is therefore an object of the present invention to provide an improved apparatus which does not require threading and rethreading of wire through a hollow support member. Another object is to provide a cantilevered support for a wired device which allows easy replacement for the device or the wire. A still further object is to provide a method of supporting a wired device which allows easy replacement of the device or its wiring.

SUMMARY OF THE INVENTION

These objects, and others which will become apparent from the following detailed description, are achieved by the present invention which comprises in one aspect an apparatus. for supporting a wired device comprising a base means to engage a support structure, a wired device engagement means, counterbalancing means to maintain the wired device in any desired position comprising boom arms and counterbalance arms, wherein the boom arms are adapted to receive wire for the wired device, and wherein the boom arms have U-shaped channels to receive the wire. The boom arms are preferably extruded metal, and more preferably extruded aluminum. The apparatus is preferably counterbalanced with springs, but could also be counterbalanced using friction supplied by friction plates or the like. Preferably the apparatus comprises lower, middle, and upper pairs of plates, a lower boom, an upper boom, and lower and upper counterbalance arms.

The wired device can be a microphone, a lamp, a video camera, an illuminated microscope, or any other wired device which can be mounted on a cantilevered apparatus which is easily moveable between first and subsequent positions without the need to take any step to secure the new position. In other words, the cantilevered, counterbalanced apparatus automatically maintains the wired device in a new position after it is moved by the user.

The U-shaped channels are preferably adapted to receive a selected size and type of wire, such as standard microphone cable in the case of microphones being the wired device, and to conceal the wire from side and front views, although the wire would normally be visable from the rear or top view.

When the U-shaped channels are about the size of the wire, the wire can be easily pressed into the channels and later easily removed and replaced if it is desired to change the device or the cable. The term U-shaped is intended to include C-shaped, wherein the sides of the channel are slightly curved inwardly.

In another aspect, the invention comprises a method of supporting a wired device in an adjustable, counterbalanced position comprising providing the aforementioned cantilevered apparatus, pressing the wire in the U-shaped channels of the boom arms, and optionally removing and replacing the wire in the channels.

DETAILED DESCRIPTION OF THE PREFERRED EMBODIMENTS

The preferred embodiments will be illustrated with reference to the drawings. Various other embodiments should become readily apparent from this description to those skilled in this art.

Figure 1:
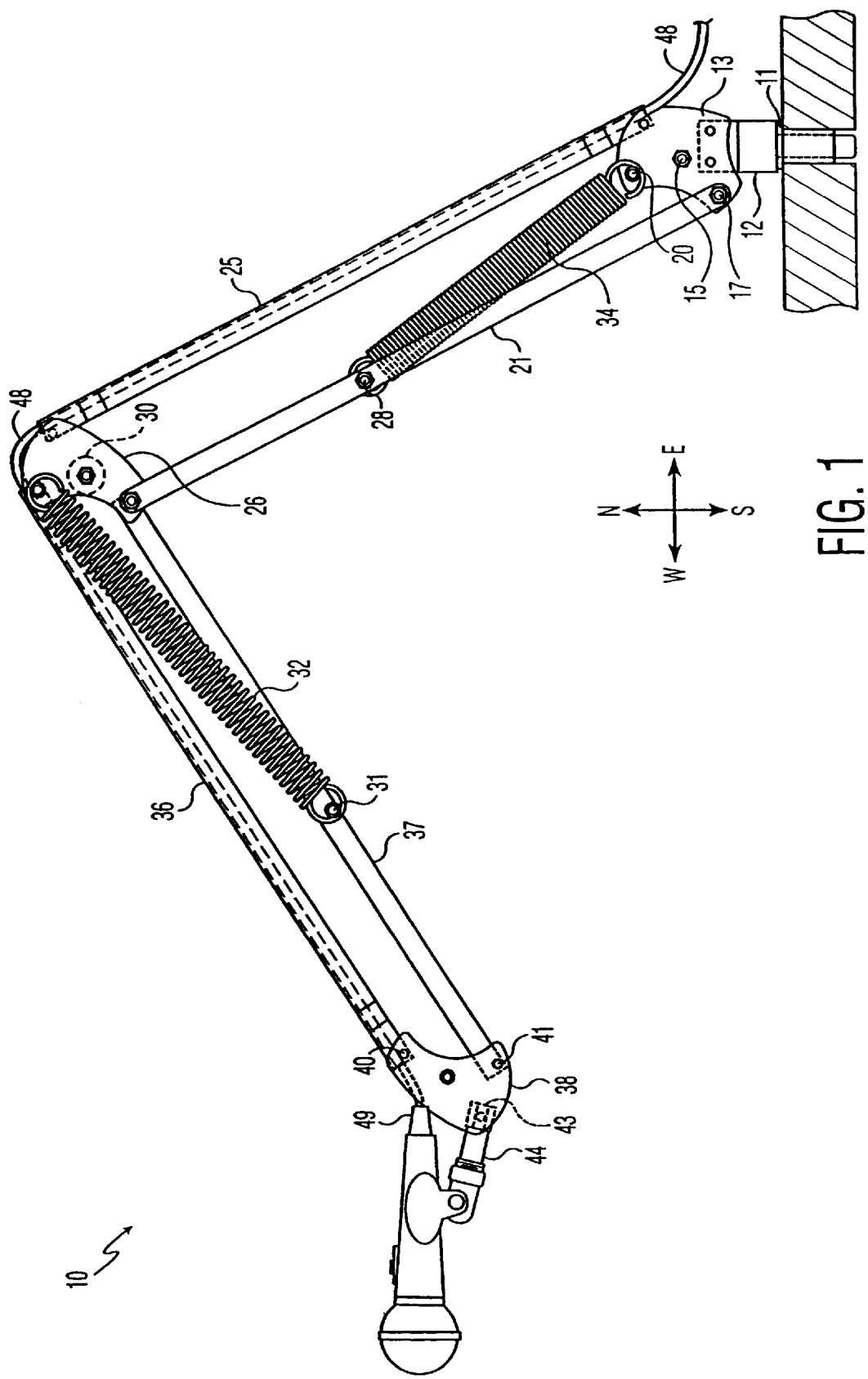
FIG. 1 is a left side perspective view of an apparatus according to the invention.

Referring to FIG. 1 of the drawings, there is shown an embodiment of the boom assembly 10 having a Delrin® acetal resin bushing 11 on a boom pivot 12. The bushing 11 is adapted to fit in a female fixture in a stationary structure such as a desk (portion shown) and the pivot 12 rotates 360 degrees within the fixture. The boom pivot 12 is held with pins between lower left plate 13 and lower right plate 14 (FIG. 2), which are in turn held in a fixed spaced parallel relationship by means of threaded fasteners 15 and 17, using spacers 18 (FIG. 3). Washers 16 (FIG. 3) are used on the threaded fasteners 15 and 17. A lower right spring mounting post 19 (FIG. 2) is fastened to lower right plate 14 (FIG. 2), and lower left spring mounting post 20 is fastened to lower left plate 13. Left lower couterbalance arm 21 and right lower counterbalance arm 22 (FIG. 2) are fastened to lower left plate 13 and lower right plate 14 (FIG. 2), respectively, and left middle joint plate 26 and right middle joint plate 27 (FIG. 2), respectively. A mid lower spacer 24 (FIG. 3) which functions as a spring contact member is fastened by means of a threaded member 28 (FIG. 3) between the left lower counterbalance arm 21 and right lower counterbalance arm 22 (FIG. 2).

Figure 2:
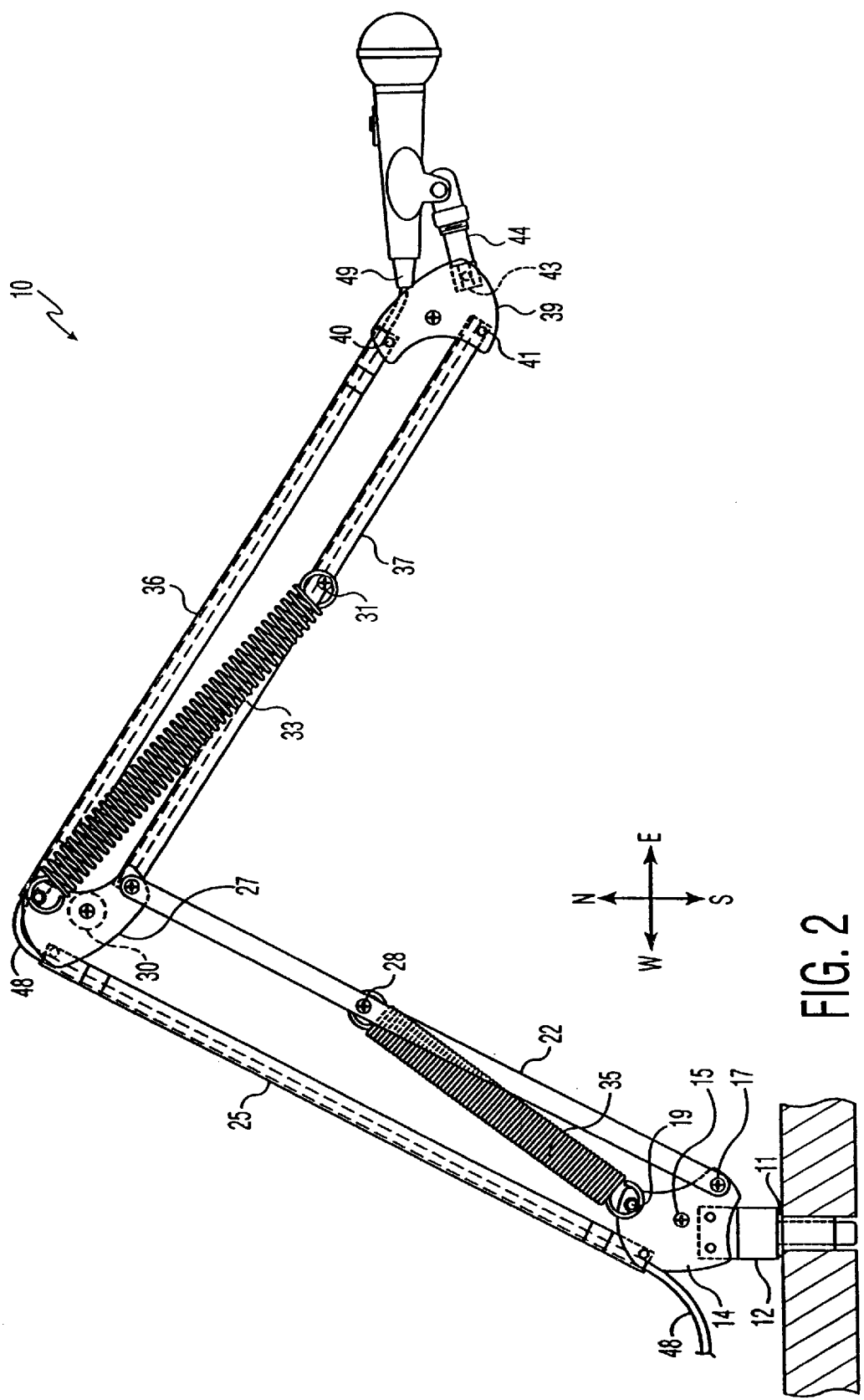
FIG. 2 is a right side perspective view of the apparatus of FIG. 1.
Figure 3:
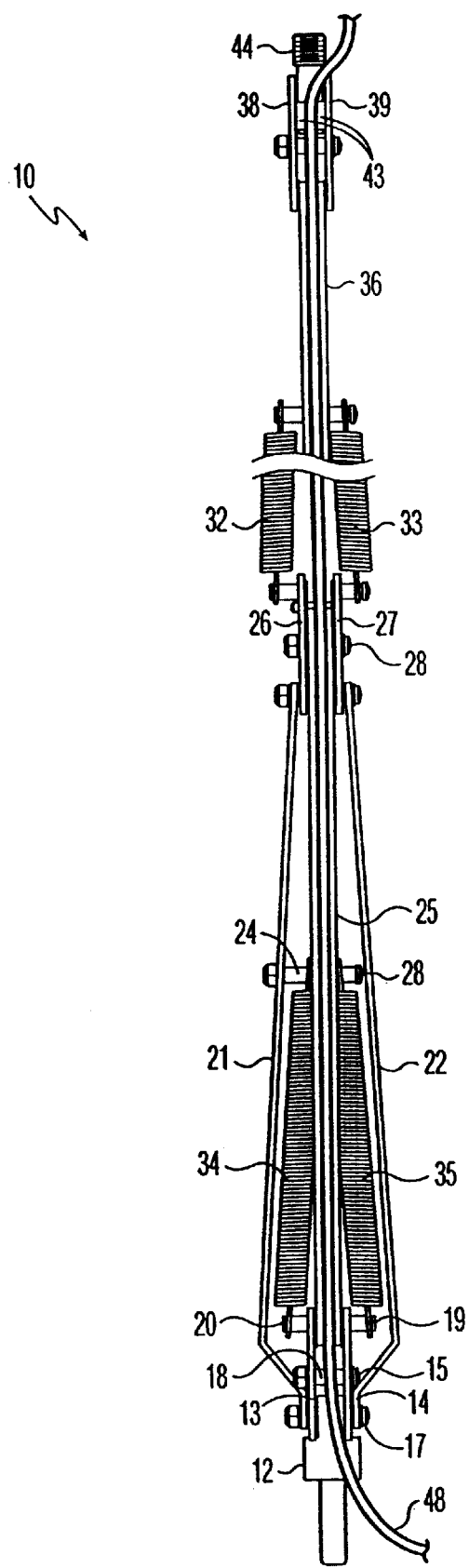
FIG. 3 is a top perspective view of the apparatus of FIG. 1.
Figure 4:
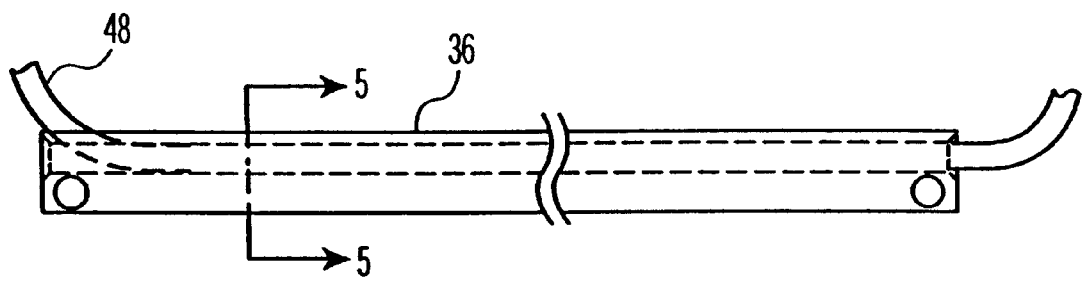
FIG. 4 is front perspective view a U-shaped counterbalance arm element of the apparatus of FIG. 1.
Figure 5:
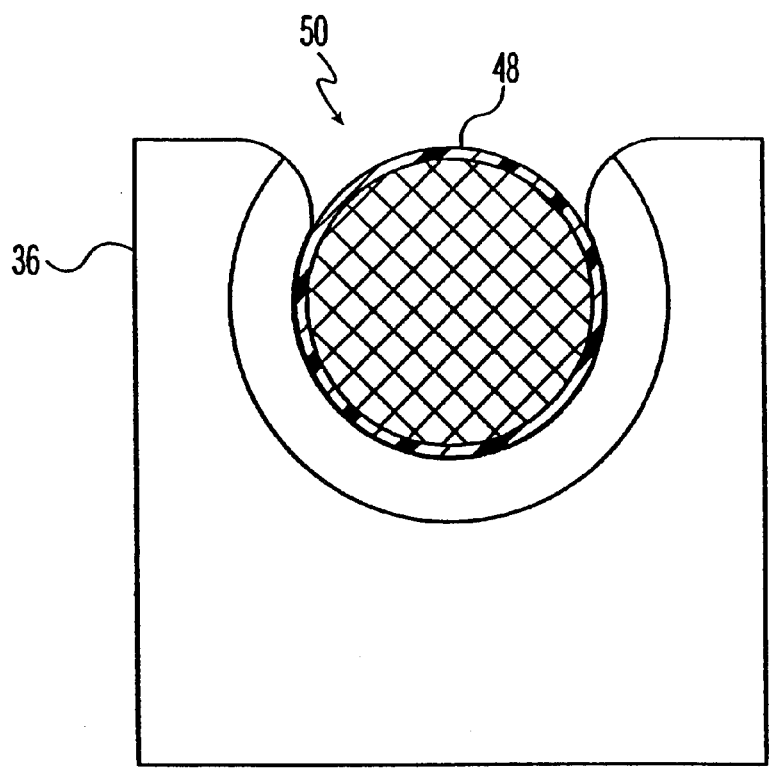
FIG. 5 is a cross-section through 5—5 of FIG. 4, showing a microphone cable inserted in the U-shaped channel of a counterbalance arm element of the apparatus of FIG. 1.

An extruded aluminum lower boom 25 (FIG. 3) having a U-shaped cable routing channel 50 (FIG. 4) is fastened with pins between the lower plates 13 and 14 (FIG. 2) and the middle joint plates 26 and 27 (FIG. 2). An extruded aluminum top upper boom 36 having U-shaped cable routing channel 50 (FIG. 5) is fastened with pins between the middle joint plates 26 and 27 (FIG. 2), and the top right plate 39 (FIG. 2) and top left plate 38. An upper counterbalance arm 37, also of extruded aluminum, is mounted between top upper plates 38 and 39 by means of pins, and between middle joint plates 26 and 27 by means of a threaded fastener. An additional threaded member 28 holds the middle joint plates 26 and 27 (FIG. 2) in a fixed spaced relationship using spacer-stop member 30 which also functions to limit the rotation of the top upper boom 36 and upper counterbalance arm 37 in the vertical axis. A center threaded spring mounting post 31 is through the upper counterbalance arm 37.

Upper left flocked spring 32 and upper right flocked spring 33 provide tension between the upper counterbalance arm 37 and center threaded mounting posts 31. Lower left flocked spring 34 and lower fight flocked spring 35 (FIG. 2) provide tension between mid lower spacer-spring contact member 24 and lower spring mounting posts 19 and 20.

Two upper joint pins 40 and 41 hold the upper counterbalance arm 37 and top upper boom 36 between top left plate 38 and top right plate 39. Microphone mount pivot pins 42 allow microphone mount insulators 43, holding threaded microphone mount 44, to pivot in a vertical axis. A microphone, not shown, can be mounted on the threaded microphone mount. A standard microphone cable 48 is easily and quickly inserted in the U-shaped channel in the top upper boom 39 and lower boom 25. The cable 48 has standard connectors 49 at the ends.

While the invention and preferred embodiments have been described and illustrated in sufficient detail that those skilled in this art may readily make and use the invention, various alternatives, modifications, and improvements should become readily apparent to those skilled in this art without departing from the spirit and scope of the invention.

What is claimed is:

1. Apparatus (10) for supporting a wired device (49) comprising
    a base means (12) to engage a support structure (11),
    a wired device engagement means (44),
    upper (36) and lower (25) boom arms,
    upper (37) and lower (21) counterbalance arms,
    means (13) to pivotally connect the lower boom arm and the lower counterbalance arm to the base means,
    means (30) to pivotally connect the upper boom arm and the upper counterbalance arm to the lower boom arm and lower counterbalance arm;
    means (38) to pivotally connect the upper boom arm and upper counterbalance arm to the wired device engagement means;
    the upper and lower boom and counterbalance arms and their respective means to pivotally connect them to the base means and wired device engagement means cooperating to counterbalance the apparatus and maintain the wired device in a desired position and allow movement to a different desired position;
    wherein the upper and lower boom arms have open U-shaped channels and are adapted to receive wire (48) for a wired device without threading and to permit replacement of the wire without rethreading, and the apparatus is adapted to permit replacement of a wired device supported by the engagement means without having to cut the wire.

2. Apparatus according to claim 1 wherein the wired device is selected from the group consisting of a microphone, a video camera, a lamp, a microscope, and an illuminated magnifying glass.

3. Apparatus according to claim 1 wherein the wire is cable.

4. Apparatus according to claim 1 wherein the upper and lower boom arms having open U-shaped channels are adapted to hold the wire in a position which is concealed from view in a plurality of directions and is viewable from one direction.

5. Apparatus according to claim 1 further comprising lower plates, middle joint plates, top plates, lower and upper counterbalance springs.

6. Apparatus according to claim 1 wherein the device is a microphone, the wire is microphone cable, and the position of the microphone can be easily changed in any direction and automatically counterbalanced in a new position.

7. Apparatus according to claim 5 wherein the device can be changed in any direction and automatically counterbalanced in a new position.

8. Apparatus according to claim 1 wherein the upper and lower boom arms having open U-shaped channels are extruded metal.

9. Apparatus according to claim 1 wherein the upper and lower boom arms are extruded aluminum.

10. Method of supporting a wired device in an adjustable, cantilevered position comprising
    providing an apparatus comprising
        a base means (12) to engage a support structure (11),
        a wired device engagement means (44),
        upper (36) and lower (25) boom arms,
        upper (37) and lower (21) counterbalance arms,
        means (13) to pivotally connect the lower boom arm and the lower counterbalance arm to the base means,
        means (30) to pivotally connect the upper boom arm and the upper counterbalance arm to the lower boom arm and lower counterbalance arm;
        means (38) to pivotally connect the upper boom arm and upper counterbalance arm to the wired device engagement means;
        the upper and lower boom and counterbalance arms and their respective means to pivotally connect them to the base means and wired device engagement means cooperating to counterbalance the apparatus and maintain the wired device in a desired position and allow movement to a different desired position;
        wherein the upper and lower boom arms have open U-shaped channels and are adapted to receive wire (48) for a wired device without threading and to permit replacement of the wire without rethreading, and the apparatus is adapted to permit replacement of a wired device supported by the engagement means without having to cut the wire,
    placing or pressing the wire in the open U-shaped channels of the boom arms without threading, and
    upon replacement of the wired device with a different wired device, removing the wire from the U-shaped channels without cutting the wire and placing or pressing the wire of the different wired device in the open U-shaped channels.

* * * * *